Nov. 10, 1931. E. N. CAVERT 1,831,160
BRAKING APPLIANCE FOR AIRPLANES
Filed Oct. 17, 1930 2 Sheets-Sheet 2
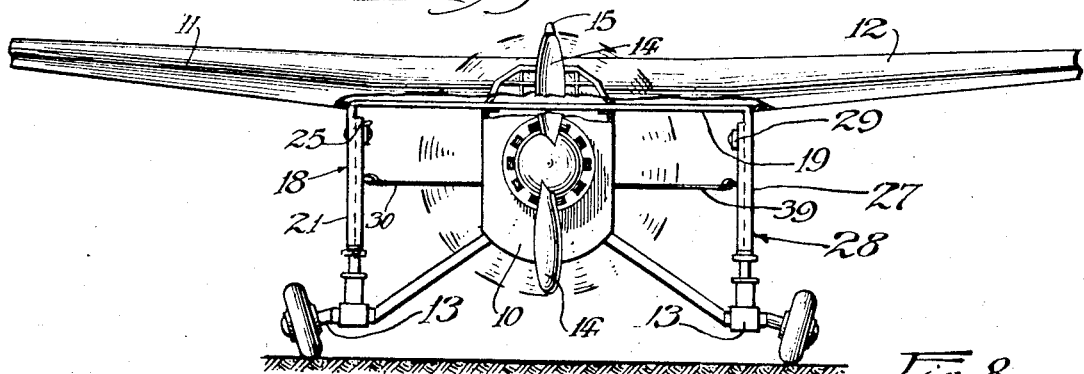
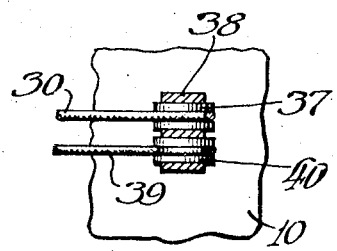
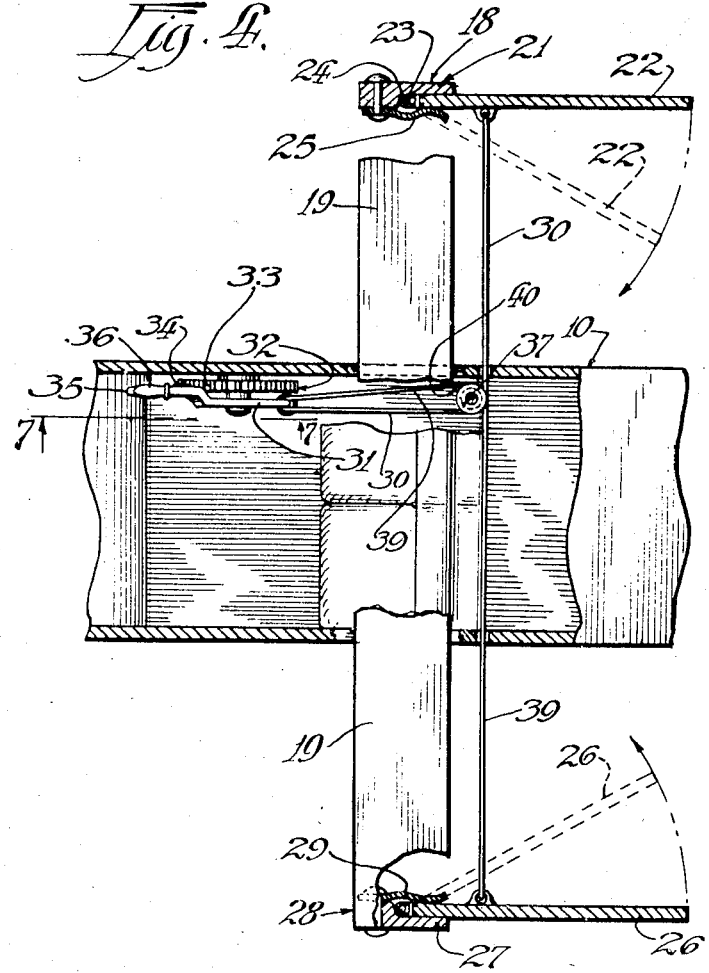
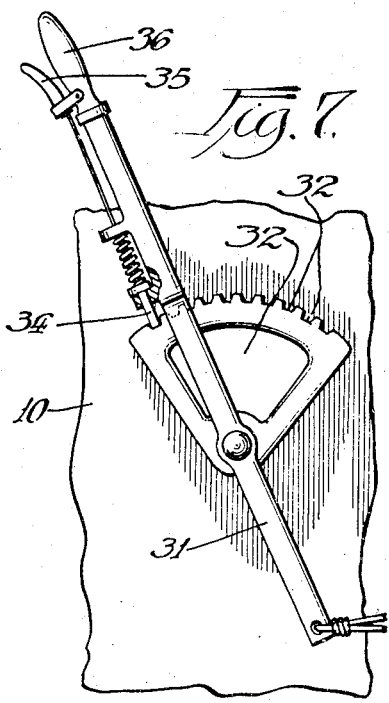
Inventor:
Edward N. Cavert,
By Joshua R. H. Potts
His Attorney.

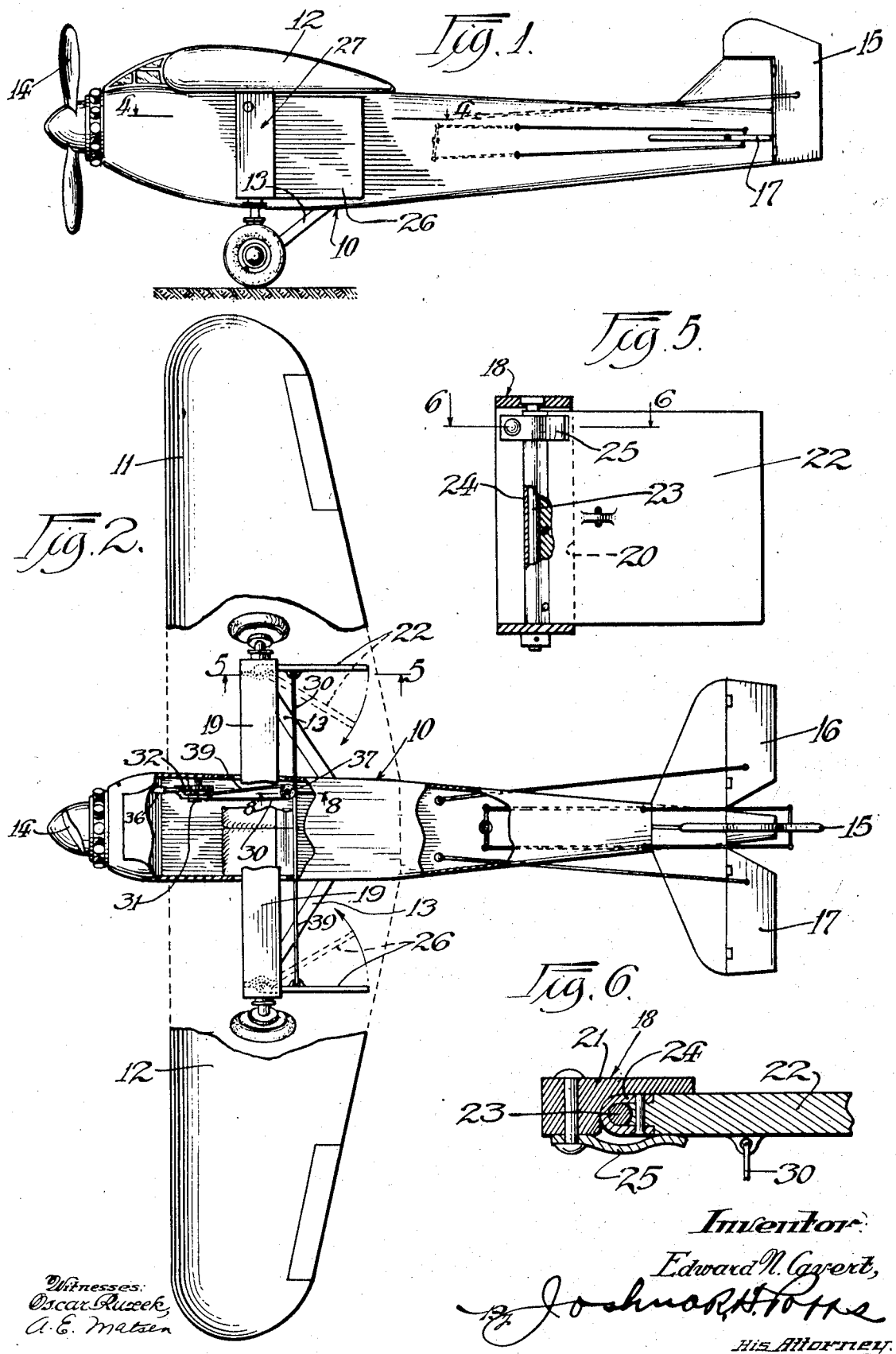

Patented Nov. 10, 1931

1,831,160

UNITED STATES PATENT OFFICE

EDWARD N. CAVERT, OF CHICAGO, ILLINOIS, ASSIGNOR OF ONE-THIRD TO SAMUEL PETERSEN AND ONE-THIRD TO GEORGE B. ARCHER, BOTH OF CHICAGO, ILLINOIS

BRAKING APPLIANCE FOR AIRPLANES

Application filed October 17, 1930. Serial No. 489,317.

This invention relates to braking appliance for airplanes, and an object of the invention is the provision of a control mechanism adapted to function as an air brake while an airplane is in flight or when making a landing. A further object of the invention is the provision of braking mechanism under the control of the pilot, arranged to be placed in the path of air so as to retard or decrease the speed of the airplane. An additional object resides in the provision of especially constructed air brake vanes adapted to operate in unison for offering resistance to the air and to concentrate and to direct the air pressure to the tail controls of the machine. This latter function serves to give the operator a more positive control of the rudder and elevators constituting the tail controls by reason of the concentration of air in the vicinity of these controlling members. The invention also permits shorter landings and tends to prevent tail spins and other accidents by reason of the increased effectiveness of the control.

Other objects will appear hereinafter.

The invention consists in the combinations and arrangements of parts hereinafter described and claimed.

The invention will be best understood by reference to the accompanying drawings forming a part of this specification, and in which:

Fig. 1 is a side elevation of an airplane equipped with the present invention;

Fig. 2 is a plan view of an airplane, as shown in Fig. 1, with the central portion of the wings broken away to show the mounting of the braking device of the present invention;

Fig. 3 is a front elevational view of the device of the present invention operatively connected to the airplane;

Fig. 4 is an enlarged horizontal sectional view taken substantially on the line 4—4 of Fig. 1;

Fig. 5 is an enlarged section showing the mounting of one of the braking vanes taken substantially on the line 5—5 of Fig. 2;

Fig. 6 is an enlarged section taken substantially on the line 6—6 of Fig. 5;

Fig. 7 is an elevation of the controlling lever taken substantially on the line 7—7 of Fig. 4; and Fig. 8 is a detail view of the cable sheaves, taken substantially on the line 8—8 of Fig. 2.

As illustrated in the drawings, the invention is shown in operative relationship with an airplane having a fuselage 10, wings 11 and 12, landing gear 13, propeller 14, rudder 15, and elevators 16 and 17.

The preferred embodiment of the invention disclosed comprises a right bearing bracket which may be conveniently secured in position by means of a horizontally extending integral brace 19 preferably mounted within the control portion of the wings 11 and 12 and suitably secured to the internal framework to avoid wind resistance. A vertically extending portion 21 provides a pivotal mounting for the right braking vane 22. As shown in Fig. 4, portion 21 of the bearing support is recessed to provide an abutment for maintaining the vane 22 normally in a position parallel with the longitudinal axis of the plane, and the leading edge of vane 22 is pivotally mounted for swinging inwardly toward the fuselage 10 by means of an elongated pin 23 disposed within a strap 24 secured to the vane 22, as best shown in Fig. 6. The vane 22 is then normally maintained in the parallel relation described by a resilient leaf spring 25 secured to portion 21 of the bracket. The mounting of the left vane 26 may be identically the same except in reversed position, having the leading edge pivotally mounted within a recess of vertically extending portion 27 of the left bearing bracket 28 integrally formed with the cross member 19, with a leaf spring 29 normally urging the vane 26 in parallel relation with the longitudinal axis of the plane.

By this construction and arrangement, it will be noted that the leading edges of the braking vanes 22 and 26 cut the air stream and the vanes are normally maintained in parallel relation with each other and with the longitudinal axis of the airplane, with the trailing edges swingable inwardly toward the fuselage. The preferred means for causing the vanes to move in unison comprises a cable 30 secured at one end to vane 22 adjacent the pivotal connection, as shown, and secured at the opposite end to the lower extremity of controlling lever 31 which is pivotally mounted on the inner wall of the fuselage, as shown, in conjunction with a notched segment 32 provided with a plurality of spaced notches 33 for selective engagement by spring latch 34 operable by member 35 pivotally mounted adjacent the lever handle 36. The cable 30 passes over an upper sheave loosely mounted on block 38 secured to the wall of the fuselage, as shown, and operating cable 39 is connected at one end to the vane 26 adjacent the pivoted mounting, then passes over the lower sheave 40 and is connected at the opposite end to the lower extremity of controlling lever 31.

In operation, by manipulating lever 31, the braking vanes 22 and 26 are moved in unison to any desired angular position for the purpose of intercepting the air stream and offering increased air resistance for braking purposes. The vanes are arranged to be swung inwardly against the tension of the leaf springs 25 and 29 and when released, the vanes are normally maintained in parallel relation by means of these spring members. The construction is exceedingly simple for the purpose, comprising a minimum number of parts, and the operation is positive and convenient. The device is of special advantage in making short landings and in overcoming tail spins and similar emergencies, by reason of the fact that when the braking vanes 22 and 26 are swung inwardly, in convergent relation toward the fuselage, an increased air current is produced and concentrated directly adjacent both sides of the fuselage for direct action upon the tail controls. As a result, more positive control is afforded the pilot by reason of the increased air current acting directly upon the rudder 15 and the elevators 16 and 17.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. The combination with an airplane, of a bearing bracket mounted upon each side of the fuselage directly beneath the wings, a braking vane member pivotally connected at its forward edge to each of said brackets and spaced from said fuselage, resilient spring means for normally maintaining said vane members in parallel relation to each other and to the longitudinal axis of the airplane, and means for swinging said vane members in unison toward each other and toward said fuselage.

2. The combination with an airplane, of a bearing bracket mounted upon each side of the fuselage directly beneath the wings, a braking vane member pivotally connected at its forward edge to each of said brackets and spaced from said fuselage, resilient spring means for normally maintaining said vane members in parallel relation to each other and to the longitudinal axis of the airplane, a controlling hand lever mounted within the fuselage, and an operative connection between said hand lever and each of said vane members for swinging said members in unison toward each other and toward said fuselage.

3. The combination with an airplane, of a bearing bracket mounted upon each side of the fuselage directly beneath the wings, a braking vane member pivotally connected at its forward edge to each of said brackets and spaced from said fuselage, resilient spring means for normally maintaining said vane members in parallel relation to each other and to the longitudinal axis of the airplane, a controlling hand lever mounted within the fuselage, an operative connection between said hand lever and each of said vane members for swinging said members in unison toward said fuselage, and means for maintaining said vane members in any selected position.

4. The combination with an airplane, of a transversely extending bracket member mounted adjacent the under surface of the wings, vertically extending portions on said bracket member equally spaced from the fuselage of said airplane, a pair of braking vane members pivotally mounted adjacent their forward edges upon said vertically extending portions, respectively, and means for swinging said vane members simultaneously toward said fuselage for the purpose of intercepting the air current and directing said current toward the rear controls.

In testimony whereof I have signed my name to this specification.

EDWARD N. CAVERT.